(12) United States Patent
Wei et al.

(10) Patent No.: US 9,467,314 B1
(45) Date of Patent: Oct. 11, 2016

(54) SIGNAL MODULATION METHOD, ADAPTIVE EQUALIZER AND MEMORY STORAGE DEVICE

(71) Applicant: PHISON ELECTRONICS CORP., Miaoli (TW)

(72) Inventors: Wei-Ting Wei, Yilan County (TW); Sheng-Wen Chen, Taichung (TW); Wei-Yung Chen, Hsinchu County (TW); Chih-Ming Chen, Hsinchu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 14/855,389

(22) Filed: Sep. 16, 2015

(30) Foreign Application Priority Data

Jul. 31, 2015 (TW) .............................. 104125036 A

(51) Int. Cl.
*H04L 25/03* (2006.01)

(52) U.S. Cl.
CPC ............................... *H04L 25/03057* (2013.01)

(58) Field of Classification Search
CPC .................. H04L 25/03057; H04L 25/03885; H04L 25/03019; H04L 27/01; H04L 7/033; H04L 2025/03611; H04L 2025/03636; H04L 7/0004; H04L 25/03; H04L 25/03891; H04B 17/24; H04B 3/14
USPC ......... 375/229–233, 340–341, 346, 350, 355
See application file for complete search history.

(56) References Cited

U.S. PATENT DOCUMENTS

| | | | |
|---|---|---|---|
| 7,123,846 B2 * | 10/2006 | Tateyama | H04B 10/25133 398/147 |
| 7,254,345 B2 * | 8/2007 | Suzaki | H04B 10/6971 375/222 |
| 7,508,892 B2 * | 3/2009 | Kibune | H04L 25/03038 375/348 |
| 7,539,096 B2 * | 5/2009 | Izuka | G11B 7/005 369/47.14 |
| 7,567,614 B2 * | 7/2009 | Carballo | H04B 17/24 375/224 |
| 7,697,649 B2 * | 4/2010 | Okamura | H04L 1/24 375/355 |
| 7,782,932 B2 * | 8/2010 | Payne | G01R 31/31715 375/224 |
| 7,787,536 B2 * | 8/2010 | Chou | H04L 1/20 375/232 |
| 7,869,379 B2 * | 1/2011 | Connolly | H04B 3/46 370/213 |
| 7,916,780 B2 * | 3/2011 | Lee | H04L 25/03885 375/232 |
| 8,054,876 B2 * | 11/2011 | Tsai | H03H 11/26 333/18 |
| 8,149,907 B2 * | 4/2012 | Chou | H03K 9/08 375/232 |
| 8,208,521 B2 * | 6/2012 | Mobin | H04L 7/0062 375/224 |
| 8,208,591 B2 * | 6/2012 | Flynn | H04L 25/03019 375/229 |
| 8,243,782 B2 * | 8/2012 | Mobin | H04L 25/03057 375/232 |
| 8,396,110 B1 * | 3/2013 | Hsieh | H04L 25/03038 375/229 |

(Continued)

Primary Examiner — Emmanuel Bayard
(74) Attorney, Agent, or Firm — Jianq Chyun IP Office

(57) ABSTRACT

A signal modulation method, an adaptive equalizer and a memory storage device are provided. The method includes: receiving a first signal; performing a first modulation on the first signal based on a first power mode to generate a second signal having a first eye-width; performing a second modulation based on a second power mode to generate the second signal having a second eye-width; determining whether the first eye-width and the second eye-width meet a first condition; if yes, performing a third modulation based on the first power mode to generate the second signal having a third eye-width; otherwise, performing the third modulation based on the second power mode to generate the second signal having the third eye-width. Therein, a power consumption of performing the second modulation is less than that of performing the first modulation. Therefore, an efficiency of the adaptive equalizer may be improved.

24 Claims, 10 Drawing Sheets

(56) References Cited

U.S. PATENT DOCUMENTS

| | | | | |
|---|---|---|---|---|
| 8,432,959 B2 * | 4/2013 | Aziz | H04L 25/0262 | 375/230 |
| 8,526,551 B2 * | 9/2013 | Flynn | G01R 13/0272 | 375/316 |
| 8,548,038 B2 * | 10/2013 | Sindalovsky | H04L 25/03057 | 375/232 |
| 8,611,403 B1 * | 12/2013 | Ding | G06F 1/3206 | 375/219 |
| 8,649,476 B2 * | 2/2014 | Malipatil | H04L 7/0062 | 375/219 |
| 8,711,906 B2 * | 4/2014 | Mobin | H04L 25/03012 | 375/219 |
| 8,744,012 B1 * | 6/2014 | Ding | H04L 1/203 | 375/316 |
| 8,837,562 B1 * | 9/2014 | Betts | H04L 5/16 | 375/222 |
| 8,860,477 B2 * | 10/2014 | Hashida | H03L 7/00 | 327/155 |
| 8,929,747 B1 * | 1/2015 | Lindsay | 398/135 | |
| 8,958,512 B1 * | 2/2015 | Ding | H04L 25/03057 | 375/229 |
| 8,989,249 B2 * | 3/2015 | Zerbe | H04L 1/0026 | 375/229 |
| 8,989,329 B2 * | 3/2015 | Hammad | H04L 7/0079 | 375/224 |
| 9,025,713 B2 * | 5/2015 | Yi | H04L 7/0331 | 375/355 |
| 9,172,566 B1 * | 10/2015 | Li | H04L 25/03885 | |
| 9,215,061 B2 * | 12/2015 | Hammad | H04L 7/0079 | |
| 9,231,796 B2 * | 1/2016 | Bulzacchelli | H04L 25/03885 | |
| 9,231,803 B2 * | 1/2016 | Nishi | H04L 27/01 | |
| 2010/0142606 A1 * | 6/2010 | Kato | H04L 25/03878 | 375/232 |
| 2013/0271193 A1 * | 10/2013 | Keith | H03L 7/0812 | 327/158 |
| 2015/0207480 A1 * | 7/2015 | Hoang | H04L 25/03 | 375/233 |
| 2015/0207570 A1 * | 7/2015 | Renaudier | H04B 10/504 | 398/140 |
| 2016/0006589 A1 * | 1/2016 | Kamali | H04B 3/46 | 375/232 |

* cited by examiner

SIGNAL MODULATION METHOD, ADAPTIVE EQUALIZER AND MEMORY STORAGE DEVICE

CROSS-REFERENCE TO RELATED APPLICATION

This application claims the priority benefit of Taiwan application serial no. 104125036, filed on Jul. 31, 2015. The entirety of the above-mentioned patent application is hereby incorporated by reference herein and made a part of this specification.

BACKGROUND

1. Technology Field

The present disclosure is directed to signal modulation and more particularly, to a signal modulation method, an adaptive equalizer and a memory storage device.

2. Description of Related Art

With advancements in data transmission speed, performance demands for receivers capable of improving data receiving capability at the receiving end have become stronger. For example, an adaptive equalizer is widely applied in a receiver of the wired transmission. In general, the adaptive equalizer is disposed with one equalizer and an eye-width detector. The eye-width detector detects an eye-width of a data signal processed by the equalizer. The detect eye-width can be used by the adaptive equalizer. For example, the adaptive equalizer can adjust a parameter of the equalizer according to the detected eye-width. According to the adjusted parameter of the equalizer, the equalizer can gradually improve signal quality of the data signal outputted by the equalizer. For example, if the eye-width of the data signal outputted by the equalizer is wider, the accuracy of sampling the data signal is higher.

However, the power mode adaptive for the equalizer may vary with different signal transmission environments. For example, in an environment with minor signal attenuation, the equalizer can be operated in a low power mode to save power consumption. For example, in an environment with high signal attenuation, the equalizer is adapted to be operated in a high power mode to increase a compensation for the signal, but a power consumption of the operation in the high power mode is relatively high. Moreover, with respect to a high-frequency signal and a low-frequency signal, the parameter used by the equalizer causes affection in different degrees of the signal quality. Therefore, how to adjust the equalizer to an optimized state in a variable environment has been one of the research subjects that the technicians of the art dedicate to.

Nothing herein should be construed as an admission of knowledge in the prior art of any portion of the disclosure. Furthermore, citation or identification of any document in this application is not an admission that such document is available as prior art to the disclosure, or that any reference forms a part of the common general knowledge in the art.

SUMMARY

The present disclosure provides a signal modulation method, an adaptive equalizer and a memory storage device capable of determining in which power mode an adaptive equalizer is to be operated according to eye-widths detected by using different power modes.

According to an exemplary embodiment of the disclosure, a signal modulation method for an adaptive equalizer is provided. The method includes: receiving a first signal; performing a first modulation on the first signal based on a first power mode to generate a second signal having a first eye-width; performing a second modulation on the first signal based on a second power mode to generate the second signal having a second eye-width, wherein a power consumption of performing the second modulation based on the second power mode is less than a power consumption of performing the first modulation based on the first power mode; determining whether the first eye-width and the second eye-width meet a first condition; performing a third modulation on the first signal based on the first power mode to generate the second signal having a third eye-width if the first eye-width and the second eye-width meets the first condition; and performing the third modulation on the first signal based on the second power mode to generate the second signal having the third eye-width if the first eye-width and the second eye-width does not meet the first condition.

According to another exemplary embodiment of the disclosure, an adaptive equalizer including an equalizer module and a power mode configuration module is provided. The power mode configuration module is coupled to the equalizer module. The equalizer module is configured to receive a first signal. The equalizer module is further configured to perform a first modulation on the first signal based on a first power mode to generate a second signal having a first eye-width. The equalizer module is further configured to perform a second modulation on the first signal based on a second power mode to generate the second signal having a second eye-width. A power consumption of performing the second modulation based on the second power mode is less than a power consumption of performing the first modulation based on the first power mode. The power mode configuration module is configured to determine whether the first eye-width and the second eye-width meet a first condition. If the first eye-width and the second eye-width meet the first condition, the equalizer module is further configured to perform a third modulation on the first signal based on the first power mode to generate the second signal having a third eye-width. If the first eye-width and the second eye-width does not meet the first condition, the equalizer module is further configured to perform the third modulation on the first signal based on the second power mode to generate the second signal having the third eye-width.

According to yet another exemplary embodiment of the disclosure, a memory storage device including a connection interface unit, a rewritable non-volatile memory module and a memory control circuit unit is provided. The connection interface unit is configured to couple to a host system. The memory control circuit unit is coupled to the connection interface unit and the rewritable non-volatile memory module. The connection interface unit includes an adaptive equalizer. The adaptive equalizer includes an equalizer module and a power mode configuration module. The power mode configuration module is coupled to the equalizer module. The equalizer module is configured to receive a first signal. The equalizer module is further configured to perform a first modulation on the first signal based on a first power mode to generate a second signal having a first eye-width. The equalizer module is further configured to perform a second modulation on the first signal based on a second power mode to generate the second signal having a second eye-width. A power consumption of performing the second modulation based on the second power mode is less than a power consumption of performing the first modulation based on the first power mode. The power mode configuration module is configured to determine whether the first eye-width and the second eye-width meet a first condition. If the first eye-width and the second eye-width meet the first condition, the equalizer module is further configured to perform a third modulation on the first signal based on the first power mode to generate the second signal having a third eye-width. If the first eye-width and the second eye-width does not meet the first condition, the equalizer module is further configured to perform the third modulation on the first signal based on the second power mode to generate the second signal having the third eye-width.

To sum up, in the disclosure, after a plurality of eye-widths of the signal are detected based on different power modes, a specific power mode in which the adaptive equalizer is to be operated can be determined according to a comparison result of the eye-widths. In this way, the adaptive equalizer can be dynamically adjusted to an optimized state in a variable environment.

In order to make the aforementioned and other features and advantages of the disclosure more comprehensible, several embodiments accompanied with figures are described in detail below.

It should be understood, however, that this Summary may not contain all of the aspects and embodiments of the disclosure, is not meant to be limiting or restrictive in any manner, and that the disclosure as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
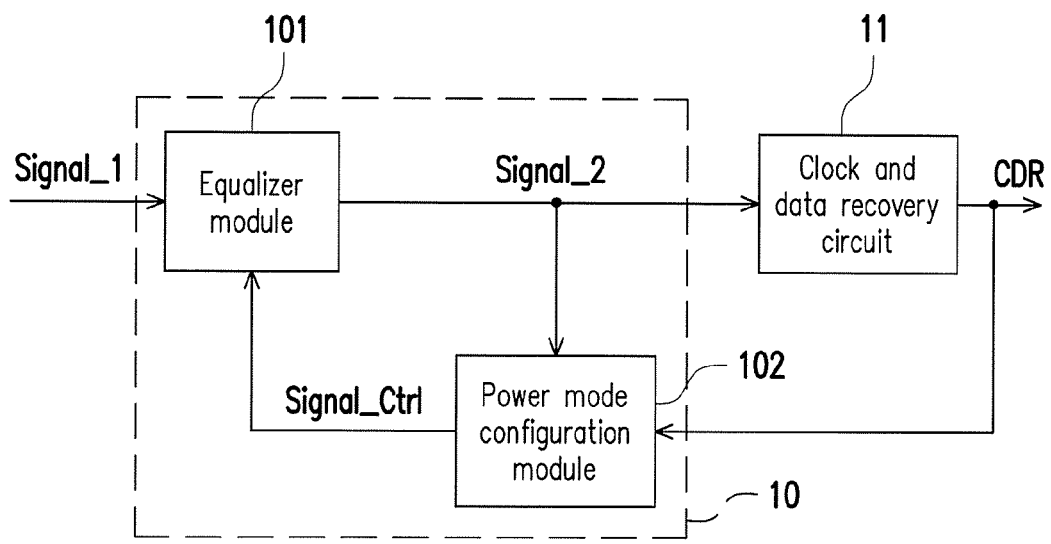
FIG. 1A is a schematic diagram illustrating an adaptive equalizer according to an exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

The disclosure is described below by means of a plurality of embodiments. However, the disclosure is not limited to the illustrated embodiments. Further, the following embodiments may be adaptively combined, replaced or omitted under reasonable circumstances to meet different practical needs. Throughout the full context of the description and the claims, the word "couple" in the description and claims may refer to any direct or indirect connection. For instance, in the description and claims, if a first device is coupled to a second device, it means that the first device may be directly connected to the second device or may indirectly connected to the second device through another device or by another connection means. In addition, the word "signal" may refer to at least one current signal, voltage signal, electric charge signal, temperature signal, data signal or any one or more signals.

Figure 1B:
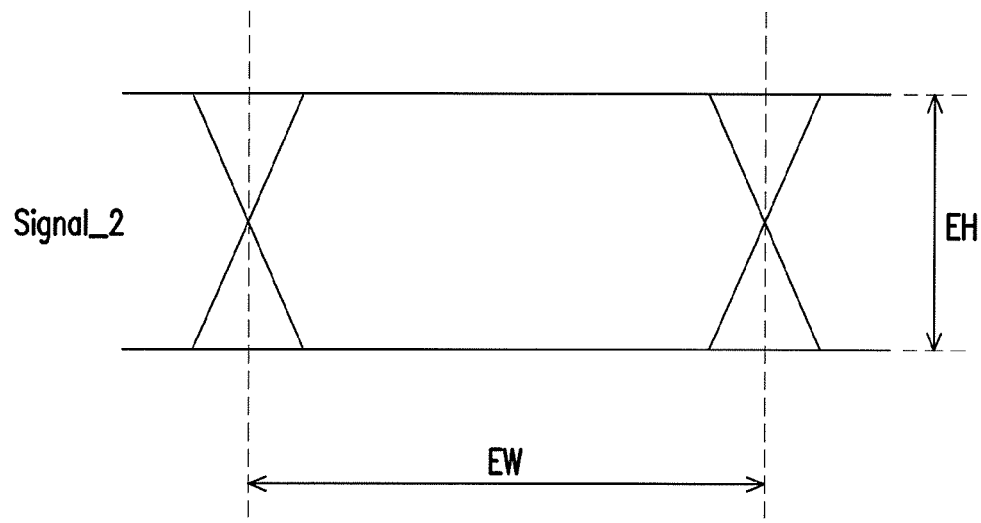
FIG. 1B is a schematic diagram illustrating an eye-width of a signal according to an exemplary embodiment of the disclosure.

FIG. 1A is a schematic diagram illustrating an adaptive equalizer according to an exemplary embodiment of the disclosure. FIG. 1B is a schematic diagram illustrating an eye-width of a signal according to an exemplary embodiment of the disclosure.

With reference to FIG. 1A, an adaptive equalizer 10 includes an equalizer module 101 and a power mode configuration module 102. The equalizer module 101 is coupled to the power mode configuration module 102.

The equalizer module 101 is configured to receive a signal Signal_1. In the present exemplary embodiment, the signal Signal_1 is a data signal. For example, the signal Signal_1 has a plurality of pulses for transmitting a series of bit data. For example, each bit data refers to a bit of "0" or "1". The signal Signal_1 is a signal with channel loss. For example, a degree of channel loss is affected by factors, such as a length or noise strength of a channel (e.g., a wired/wireless channel). An application of the equalizer module 101 is to compensate the channel loss of the signal Signal_1. For example, the equalizer module 101 modulates the signal Signal_1 to generate and output a signal Signal_2. For example, the equalizer module 101 performs the modulation on the signal Signal_1 by using different parameters to attempt to output the signal Signal_2 with better signal quality or a pulse waveform favorable for analysis.

In the present exemplary embodiment, the pulse waveform of the signal Signal_2 may be considered as including a plurality of eyes. An eye-width of the signal Signal_2 may serve to represent a width of one or more eyes in the pulse waveform of the signal Signal_2. Generally, as the eye-width of the signal Signal_2 is wider, it represents that the signal quality of the signal Signal_2 is better (e.g., the sampling of the signal Signal_2 may be easier and more accurate). Otherwise, as the eye-width of the signal Signal_2 is narrower, it represents that the signal quality of the signal Signal_2 is worse (e.g., the sampling of the signal Signal_2 is more difficult, and deviation occurs easily). For example, the equalizer module 101 may be operated with at least one eye-width detector to obtain an eye-width EW of the signal Signal_2, as shown in FIG. 1B. Additionally, in an exemplary embodiment, the equalizer module 101 may also detect an eye-height EH of the signal Signal_2, as shown in FIG. 1B.

In the present exemplary embodiment, the equalizer module 101 may modulate the signal Signal_1I by using different parameters to obtain a parameter for outputting the signal Signal_2 having the maximum eye-width. For example, an eye-width of the currently generated signal Signal_2 of the equalizer module 101 is compared with an eye-width of the previously generated signal Signal_2. If the eye-width EW of the currently generated signal Signal_2 is less than or equal to the eye-width of the previously generated signal Signal_2, the equalizer module 101 may then modulate the signal Signal_1 again by using another parameter. If the eye-width EW of the currently generated signal Signal_2 is greater than the eye-width of the previously generated signal Signal_2, then the parameter currently used by the equalizer module 101 and the eye-widths currently obtained may be recorded. After a plurality of modulations are repeatedly performed on the signal Signal_1, the parameter corresponding to the signal Signal_2 having the maximum eye-width may be determined among the parameters. The determined parameter may be considered as an optimized parameter corresponding to the current signal Signal_1. The maximum (i.e., the maximum eye-width) among the recorded eye-widths may be considered as the optimized eye-width corresponding to the current signal Signal_1 (or the signal Signal_2). Alternatively, if each record operation refers to an update operation, the last update and the eye-width corresponding thereto are the optimized parameter and the optimized eye-width, respectively. After the optimized parameter and the optimized eye-width are obtained, the optimized parameter may be used afterwards for modulating the signal Signal_1 to generate the signal Signal_2 which may have the best signal quality or may be the optimal.

In the present exemplary embodiment, the adaptive equalizer 10 is operated with a clock and data recovery (CDR) circuit 11. For example, the clock and data recovery circuit 11 receives the signal Signal_2 output by the adaptive equalizer 10 and performs a phase lock operation according to the signal Signal_2 to output an output clock CDR. The clock and data recovery circuit 11 will not be described in detail herein. In the present exemplary embodiment, the adaptive equalizer 10 also receives the output clock CDR output by the clock and data recovery circuit 11 and performs the eye-width detection on the signal Signal_2 according to the output clock CDR.

In an exemplary embodiment, the adaptive equalizer 10 further detects an eye-height of the signal Signal_2 and adjusts the eye-height of the signal Signal_2 to an acceptable range of the clock and data recovery circuit 11 through changing a modulation voltage for modulating the signal Signal_1. However, in another exemplary embodiment, the adaptive equalizer 10 may also be applied in other ways, without being operated with the clock and data recovery circuit 11.

In the present exemplary embodiment, the equalizer module 101 may be set to operate in one of a plurality of power modes. For example, in the present exemplary embodiment, the equalizer module 101 may be set to operate in one of a high power mode and a low power mode. In the high power mode, the equalizer module 101 has a high power consumption of performing the modulation on the signal Signal_1, but has a good efficiency of compensating the channel loss of the signal Signal_1. In the low power mode, the equalizer module 101 has a low power consumption of performing the modulation on the signal Signal_1, but has less efficiency of compensating the channel loss of the signal Signal_1. In other words, if the signal channel is in a worse condition, the eye-width of the signal Signal_2 measured when the equalizer module 101 is operated in the high power mode is usually greater than the eye-width of the signal Signal_2 measured when the equalizer module 101 is operated in the low power mode. However, if the signal channel is in a fair or good condition, the equalizer module 101 being operated in the low power mode is more power-saving than being operated in the high power mode, while the signal quality of the generated signal Signal_2 will not be too bad.

In the present exemplary embodiment, the equalizer module 101 may also set to perform the modulation based on a high frequency peak corresponding to the signal Signal_1 or a low frequency peak corresponding to the signal Signal_1. For example, if the equalizer module 101 is set to perform the modulation based on the high frequency peak corresponding to the signal Signal_1, the equalizer module 101 is better at high frequency compensation for the signal Signal_1. By contrast, if the equalizer module 101 is set to perform the modulation based on the low frequency peak corresponding to the signal Signal_1, the equalizer module 101 is better at low frequency compensation for the signal Signal_1.

In the present exemplary embodiment, the equalizer module 101 may perform at least one modulation on the signal Signal_1 based on a specific power mode (which is also referred to as a first power mode) to generate a signal Signal_2 having a specific eye-width (which is also referred to as a first eye-width). The equalizer module 101 may perform at least one modulation on the signal Signal_1 based on another power mode (which is also referred to as a second power mode) to generate the signal Signal_2 having another eye-width (which is also referred to as a second eye-width). A power consumption of performing the second modulation based on the second power mode is less than a power consumption of performing the first modulation based on the first power mode. For descriptive convenience hereinafter, the at least one modulation performed on the signal Signal_1 by the equalizer module 101 based on the first power mode is referred to as a first modulation, and the at least one modulation performed on the signal Signal_1 by the equalizer module 101 based on the second power mode is referred to as a second modulation. In other words, each of the first modulation and the second modulation includes at least one modulation performed on the signal Signal_1.

For example, in the present exemplary embodiment, if it is assumed that the first power mode is a high power mode, and the second power mode is a low power mode, the first eye-width is an optimized eye-width (or a maximum eye-width) obtained by the equalizer module 101 performing the first modulation in the high power mode, and the second eye-width is the optimized eye-width (or the maximum eye-width) obtained by the equalizer module 101 performing the second modulation in the low power mode. In addition, if at least one modulation performed repeatedly and corresponding eye-width detection in the first modulation and the second modulation are considered as including at least one feedback, the first eye-width may also be considered as the optimized eye-width (or the maximum eye-width) obtained through a feedback in the modulation performed by the equalizer module 101 operated in the high power mode, and the second eye-width may be considered as the optimized eye-width (or the maximum eye-width) obtained through a feedback in the modulation performed by the equalizer module 101 operated in the low power mode.

In the present exemplary embodiment, the equalizer module 101 first generates the signal Signal_2 having the first eye-width based on the first power mode and then generates the signal Signal_2 having the second eye-width based on the second power mode. However, in another exemplary embodiment, the equalizer module 101 first generates the signal Signal_2 having the second eye-width based on the second power mode and then generates the signal Signal_2 having the first eye-width based on the first power mode. Alternatively, in another exemplary embodiment, if the equalizer module 101 is capable of processing the signal Signal_1 in parallel, the equalizer module 101 may also perform the first modulation and the second modulation synchronously based on the first power mode and the second power mode, respectively.

After the signal Signal_2 having the first eye-width and the signal Signal_2 having the second eye-width are generated, the power mode configuration module 102 determines whether the first eye-width and the second eye-width meet a specific condition (which is also referred to as a first condition). If the first eye-width and the second eye-width meet the first condition, the equalizer module 101 performs at least one modulation on the signal Signal_1 based on the first power mode to generate the signal Signal_2 having another eye-width (which is also referred to as a third eye-width). If the first eye-width and the second eye-width do not meet the first condition, the equalizer module 101 performs at least one modulation on the signal Signal_1 based on the second power mode to generate the signal Signal_2 having the third eye-width.

For descriptive convenience hereinafter, the at least one modulation performed on the signal Signal_1 by the equalizer module 101 based on the first power mode or the second power mode after whether the first eye-width and the second eye-width meet the first condition is determined is referred to as a third modulation. The third eye-width may be considered as the optimized eye-width (or the maximum eye-width) obtained by the equalizer module 101 performing the third modulation in the high power mode or the low power mode. Alternatively, the third eye-width may also be considered as the optimized eye-width (or the maximum eye-width) obtained through a feedback in the modulation performed by the equalizer module 101 operated in the high power mode or the low power mode.

In the present exemplary embodiment, the power mode configuration module 102 outputs a signal Signal_Ctrl to instruct in which power mode the equalizer module 101 is to be operated. The signal Signal_Ctrl may also be considered as a control signal configured to control the equalizer module 101. For example, if the first eye-width and the second eye-width are determined as meeting the first condition, the power mode configuration module 102 outputs the signal Signal_Ctrl instructing to use the first power mode to the equalizer module 101; if the first eye-width and the second eye-width are determined as not meeting the first condition, the power mode configuration module 102 outputs the signal Signal_Ctrl instructing to use the second power mode to the equalizer module 101. Additionally, in an exemplary embodiment, the power mode configuration module 102 may also, before determining whether the first eye-width and the second eye-width meet the first condition, outputs the corresponding signal Signal_Ctrl to instruct the equalizer module 101 to perform the first modulation based on the first power mode or to perform the second modulation based on the second power mode.

Figure 2:
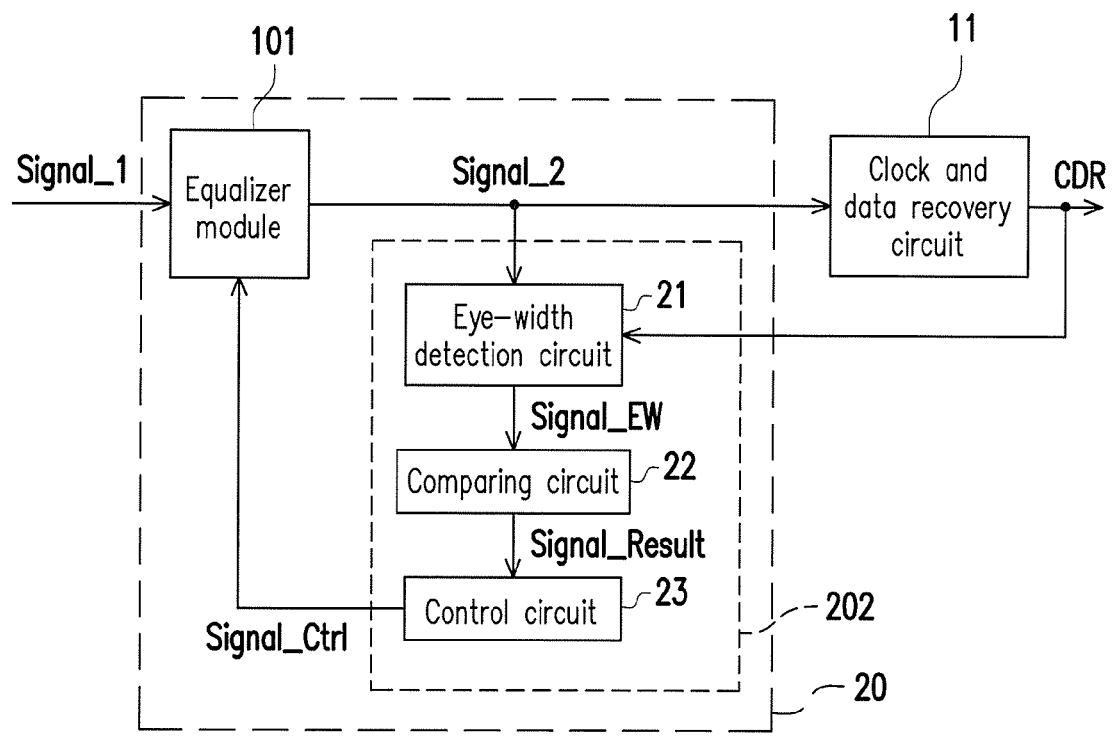
FIG. 2 is a schematic graph illustrating an adaptive equalizer according to another exemplary embodiment of the disclosure.

FIG. 2 is a schematic graph illustrating an adaptive equalizer according to another exemplary embodiment of the disclosure.

With reference to FIG. 2, an adaptive equalizer 20 includes the equalizer module 101 and a power mode configuration module 202. The power mode configuration module 202 includes an eye-width detection circuit 21, a comparing circuit 22 and a control circuit 23.

The eye-width detection circuit 21 is coupled to the equalizer module 101. The eye-width detection circuit 21 detects an eye-width of the signal Signal_2. For example, the eye-width detection circuit 21 receives the signal Signal_2, analyzes the signal Signal_2 and outputs a corresponding signal Signal_EW. The signal Signal_EW may also be considered as an eye-width signal corresponding to the signal Signal_2. The signal Signal_EW contains information with respect to the detected eye-width. For example, the signal Signal_EW output at different time points contains information with respect one of the first eye-width, the second eye-width and the third eye-width.

The comparing circuit 22 is coupled to the eye-width detection circuit 21. The comparing circuit 22 receives the signal Signal_EW. According to the signal Signal_EW, the comparing circuit 22 compares the first eye-width with the second eye-width, and outputs a signal Signal_Result to the control circuit 23. For example, the comparing circuit 22 determines whether the first eye-width is greater than the second eye-width, and the signal Signal_Result is in response to the determination that the first eye-width is greater than the second eye-width or that the first eye-width is not greater than the second eye-width. In other words, the signal Signal_EW contains information with respect to the comparison result of the first eye-width and the second eye-width.

The control circuit 23 is coupled to the comparing circuit 21 and the equalizer module 101. According to the signal Signal_Result, the control circuit 23 may learn whether the first eye-width is greater than the second eye-width. If the first eye-width is greater than the second eye-width, the control circuit 23 generates and outputs the signal Signal_Ctrl instructing to use the first power mode. If the first eye-width is not greater than the second eye-width, the control circuit 23 generates and outputs the signal Signal_Ctrl instructing to use the second power mode.

In other words, in the present exemplary embodiment, determining whether the first eye-width is greater than second eye-width may be considered as determining whether the first eye-width and the second eye-width meet the first condition. If the first eye-width is greater than the second eye-width, it may be considered as the first eye-width and the second eye-width meeting the first condition. If the first eye-width is not greater than the second eye-width, it may be considered as the first eye-width and the second eye-width not meeting the first condition.

It should be noted that in the exemplary embodiment described above, the first modulation and the second modulation are performed by the equalizer module 101 corresponding to the first frequency peak of the signal Signal_1, and the third modulation is performed by the equalizer module 101 corresponding to the second frequency peak of the signal Signal_1. A frequency of the first frequency peak is higher than a frequency of the second frequency peak. In an exemplary embodiment, the first frequency peak may be considered as a high frequency peak, and the second frequency peak may be considered as a low frequency peak. Thus, in the first modulation and the second modulation, the equalizer module 101 is better at high frequency compensation for the signal Signal_1, while in the third modulation, the equalizer module 101 is better at low frequency compensation for the signal Signal_1. Additionally, in another exemplary embodiment, the first modulation and the second modulation may also be performed by the equalizer module 101 corresponding to the second frequency peak of the signal Signal_1, and the third modulation may also be performed by the equalizer module 101 corresponding to the first frequency peak of the signal Signal_1, such that the first modulation and the second modulation are better at low frequency compensation for the signal Signal_1, and the third modulation is better at high frequency compensation for the signal Signal_1.

In the exemplary embodiment described above, the signal Signal_Ctrl output by the power mode configuration module 102 or 202 may also be configured to instruct the equalizer module 101 to perform the modulation corresponding to the first frequency peak of the signal Signal_1 or the second frequency peak of the signal Signal_1. However, in another exemplary embodiment, the equalizer module 101 may also automatically switch to corresponding to the first frequency peak or the second frequency peak to perform the modulation according to a predetermined rule. For example, before receiving the signal Signal_Ctrl instructing to perform the third modulation, the equalizer module 101 may perform the modulation corresponding to the first frequency peak of the signal Signal_1; after receiving the signal Signal_Ctrl instructing to perform the third modulation, the equalizer module 101 may automatically switch to perform the modulation corresponding to the second frequency peak of the signal Signal_1.

In the present exemplary embodiment, the power mode configuration modules 102 and 202 may be formed by a plurality of circuit elements together with embedded controllers or micro controllers. For example, each of the eye-width detection circuit 21 and the comparing circuit 22 may be formed by at least one of a sampling circuit, a logic (e.g., AND, OR and/or XOR) circuit, delay circuit, a flip-flop circuit and a latch circuit; the control circuit 23 may be formed by at least one of an embedded controller or a microcontroller, a similar chip or circuit module. Alternatively, in another exemplary embodiment, the power mode configuration module 102 or 202 may include a memory and a microprocessor, and the microprocessor may load programs from the memory to perform at least part of the aforementioned functions of the power mode configuration module.

Figure 3:
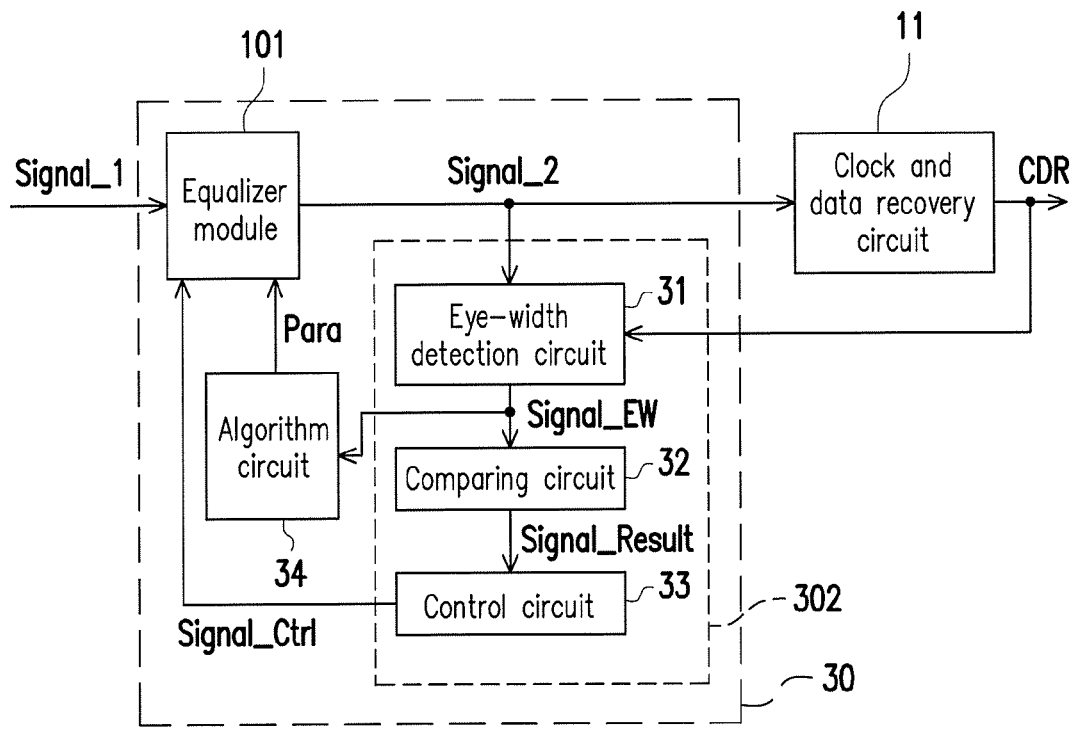
FIG. 3 is a schematic diagram illustrating an adaptive equalizer according to yet another exemplary embodiment of the disclosure.

FIG. 3 is a schematic diagram illustrating an adaptive equalizer according to yet another exemplary embodiment of the disclosure.

With reference to FIG. 3, an adaptive equalizer 30 includes the equalizer module 101 and a power mode configuration module 302. The power mode configuration module 302 includes an eye-width detection circuit 31, a comparing circuit 32 and a control circuit 33. However, the power mode configuration module 302 is the same as or similar to the power mode configuration module 202 illustrated in FIG. 2, and thus, the eye-width detection circuit 31, the comparing circuit 32 and the control circuit 33 are respectively the same as or similar to the eye-width detection circuit 21, the comparing circuit 22 and the control circuit 23 illustrated in FIG. 2, which will not be repeatedly described hereinafter.

In the present exemplary embodiment, the adaptive equalizer 30 further includes an algorithm circuit 34. The algorithm circuit 34 is coupled between the eye-width detection circuit 31 and the equalizer module 101. The algorithm circuit 34 is configured to receive the signal Signal_EW output by the eye-width detection circuit 31 and generate a corresponding parameter Para for the equalizer module 101. For example, in the first modulation, the second modulation and the third modulation, the eye-width detection circuit 31 continuously detects the eye-width of the signal Signal_2 and outputs the corresponding signal Signal_EW. The algorithm circuit 34 continuously receives the signal Signal_EW and generates different parameters Para for the equalizer module 101 by means of an algorithm. According to the parameters Para, the equalizer module 101 continuously modulates the signal Signal_1 to generate the signal Signal_2 having different eye-widths, until the algorithm circuit 34 determines that the optimized parameter and the corresponding optimized eye-width are obtained.

In the present exemplary embodiment, the algorithm circuit 34 may also be formed by a plurality of circuit elements together with an embedded controller or a microcontroller. Alternatively, in another exemplary embodiment, the algorithm circuit 34 may also a combination including at least one memory and microprocessor, which will not be repeatedly described.

Figure 4A:
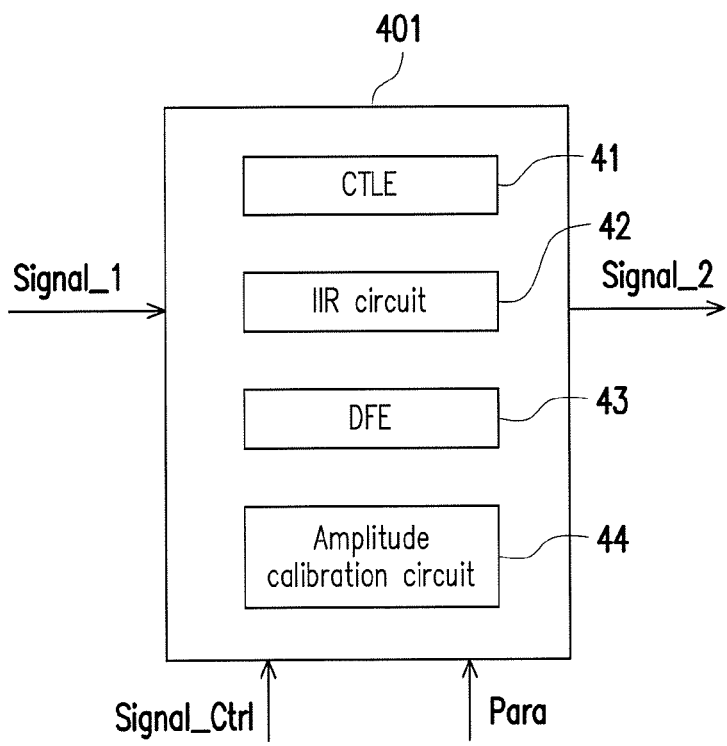
FIG. 4A is a schematic diagram illustrating an equalizer module according to an exemplary embodiment of the disclosure.

FIG. 4A is a schematic diagram illustrating an equalizer module according to an exemplary embodiment of the disclosure.

With reference to FIG. 4A, an equalizer module 401 includes a continuous-time linear equalizer (CTLE) 41. The number of the CTLE 41 may be one or a plurality. In the first modulation, the second modulation and the third modulation, the CTLE 41 modulates the signal Signal_1 according to the parameters Para. Additionally, the CTLE 41 may determine to operate itself in which power mode (e.g., the first power mode or the second power mode) according to the signal Signal_Ctrl and to perform modulate corresponding to which frequency (e.g., the first frequency peak or the second frequency peak). However, in other exemplary embodiments, the equalizer module 401 may also include other types of equalizers.

For example, in another exemplary embodiment of FIG. 4A, the equalizer module 401 further includes at least one of an infinite impulse response (IIR) circuit 42 and a decision feedback equalizer (DFE) 43. The numbers of the IIR circuit 42 and the DFE 43 may be one or a plurality, respectively.

In an exemplary embodiment where the IIR circuit 42 is used, during the process of at last one of the first modulation, the second modulation and the third modulation, the CTLE 41 with the IIR circuit 42 modulates the signal Signal_1 to output the signal Signal_2. For example, the CTLE 41 may first modulate the signal Signal_1, and the IIR circuit 42 may then modulate an output of the CTLE 41 to generate the signal Signal_2. Alternatively, the IIR circuit 42 may first modulate the signal Signal_1, and the CTLE 41 may then modulate the output of the IIR circuit 42 to generate the signal Signal_2.

In an exemplary embodiment where the DFE 43 is used, during the process of at last one of the first modulation, the second modulation and the third modulation, the CTLE 41 with the DFE 43 modulates the signal Signal_1 to output the signal Signal_2. For example, the CTLE 41 and the DFE 43 may take turns to be used to modulate the signal Signal_1, and the disclosure is not intent to limit the use sequence of the CTLE 41 and the DFE 43.

In an exemplary embodiment, the signal Signal_Ctrl may also be configured to set a working mode of the IIR circuit 42 and/or the DFE 43. For example, the signal Signal_Ctrl may be configured to change a clock frequency and/or a working voltage of the IIR circuit 42 and/or the DFE 43.

In another exemplary embodiment, the signal Signal_Ctrl may also be configured to instruct at least one of the CTLE 41, the IIR circuit 42 and the DFE 43 to use a coarse mode or a fine mode. For example, in the coarse mode, a level gap of the used modulation voltages is wider, while in the fine mode, the level gap of the used modulation voltages is narrower.

In an exemplary embodiment, the equalizer module 401 further includes an amplitude calibration circuit 44. The amplitude calibration circuit 44 is configured to perform amplitude calibration on the signal Signal_2 (or the signal Signal_1) during the process of at last one of the first modulation, the second modulation and the third modulation. For example, the amplitude calibration circuit 44 may detect and adjust the eye-height of the signal Signal_2, such that the eye-height of the signal Signal_2 is gradually adjusted to a range acceptable for the clock and data recovery circuit 11. For example, the amplitude calibration circuit 44 may instruct the CTLE 41 to use an adaptive modulation voltage to maintain the eye-height of the signal Signal_2 as being greater than a predetermined value.

Figure 4B:
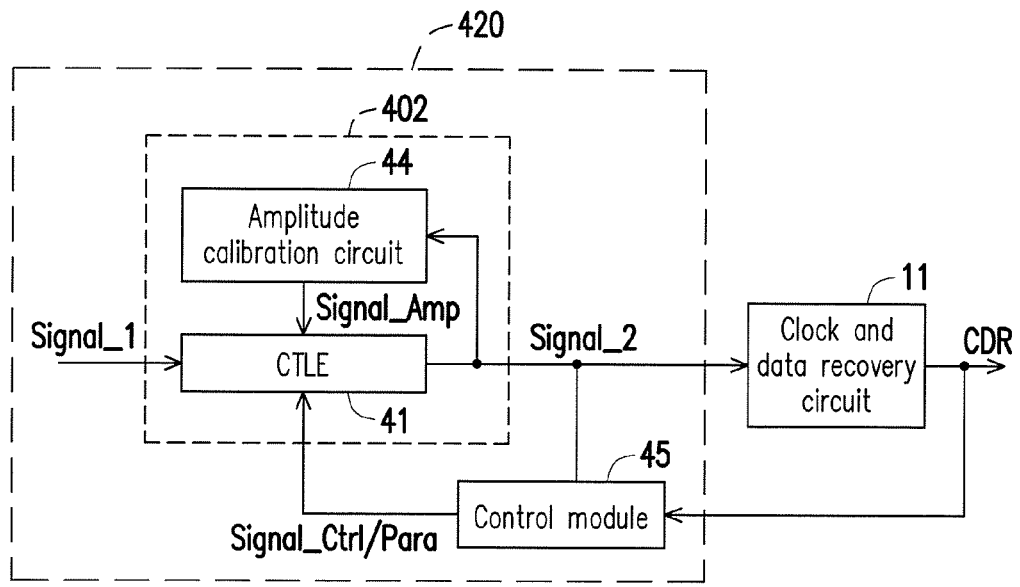
FIG. 4B is a schematic diagram illustrating an adaptive equalizer including a continuous-time linear equalizer (CTLE) and an amplitude calibration circuit according to an exemplary embodiment of the disclosure.

FIG. 4B is a schematic diagram illustrating an adaptive equalizer including a CTLE and an amplitude calibration circuit according to an exemplary embodiment of the disclosure.

With reference to FIG. 4B, an adaptive equalizer 420 includes an equalizer module 402 and a control module 45. The equalizer module 402 is coupled to the control module 45. The control module 45 is configured to generate the signal Signal_Ctrl and the parameter Para. For example, the control module 45 may include the power mode configuration module 302 and the algorithm circuit 34 illustrated in FIG. 3. Additionally, the adaptive equalizer 420 is coupled to the clock and data recovery circuit 11.

The equalizer module 402 includes the CTLE 41 and the amplitude calibration circuit 44. The CTLE 41 receives the signal Signal_Ctrl to operate in the corresponding power mode. The CTLE 41 receives the signal Signal_1 and modulates the signal Signal_1 according to the parameter Para to output the signal Signal_2.

An input of the amplitude calibration circuit 44 is coupled to the output of the CTLE 41. The amplitude calibration circuit 44 detects the eye-height (e.g., the eye-height EH illustrated in FIG. 1B) of the signal Signal_2 and correspondingly outputs a signal Signal_Amp to the CTLE 41. The CTLE 41 adjusts the eye-height of the signal Signal_2 according to the signal Signal_Amp. For example, the signal Signal_Amp is configured to lock the eye-height of the signal Signal_2 in a predetermined eye-height range, and the parameter Para is configured to lock the eye-width of the signal Signal_2 in a predetermined eye-width range (e.g., the optimized eye-width). According to the signal Signal_Amp and the parameter Para, the CTLE 41 outputs the signal Signal_2 with better signal quality.

Figure 4C:
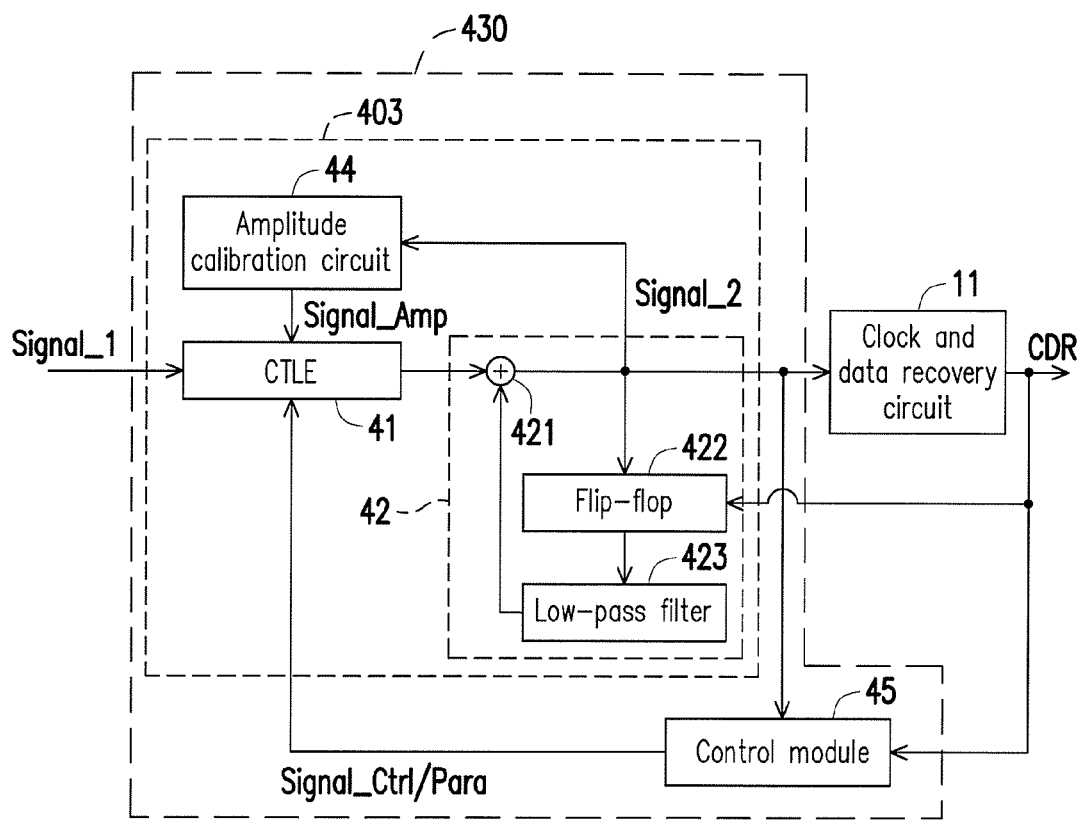
FIG. 4C is a schematic diagram illustrating an adaptive equalizer including a CTLE, an infinite impulse response (IIR) circuit and an amplitude calibration circuit according to an exemplary embodiment of the disclosure.

FIG. 4C is a schematic diagram illustrating an adaptive equalizer including a CTLE, an IIR circuit and an amplitude calibration circuit according to an exemplary embodiment of the disclosure.

With reference to FIG. 4C, the adaptive equalizer 430 includes an equalizer module 403 and the control module 45. The equalizer module 403 is coupled to the control module 45. The control module 45 is configured to generate the signal Signal_Ctrl and the parameter Para. For example, the control module 45 may include the power mode configuration module 302 and the algorithm circuit 34 illustrated in FIG. 3. Additionally, the adaptive equalizer 430 is coupled to the clock and data recovery circuit 11.

The equalizer module 403 includes the CTLE 41, IIR circuit 42 and the amplitude calibration circuit 44. The CTLE 41 receives the Signal_Ctrl to operate in the corresponding power mode and modulates the signal Signal_1 according to the signal Signal_Amp and the parameter Para. The IIR circuit 421 is coupled to the output of the CTLE 41.

The IIR circuit 42 includes an adder circuit 421, a flip-flop 422 and a low-pass filter 423. The adder circuit 421 adds the output of the CTLE 41 with an output of the low-pass filter 423 to generate the signal Signal_2. The flip-flop 422 is coupled to an output of the adder circuit 421 and generates an output according to the signal Signal_2. For example, the flip-flop 422 may sample the signal Signal_2 according to the output clock CDR to generate an output. The low-pass filter 423 filters the output of the flip-flop 422.

Figure 4D:
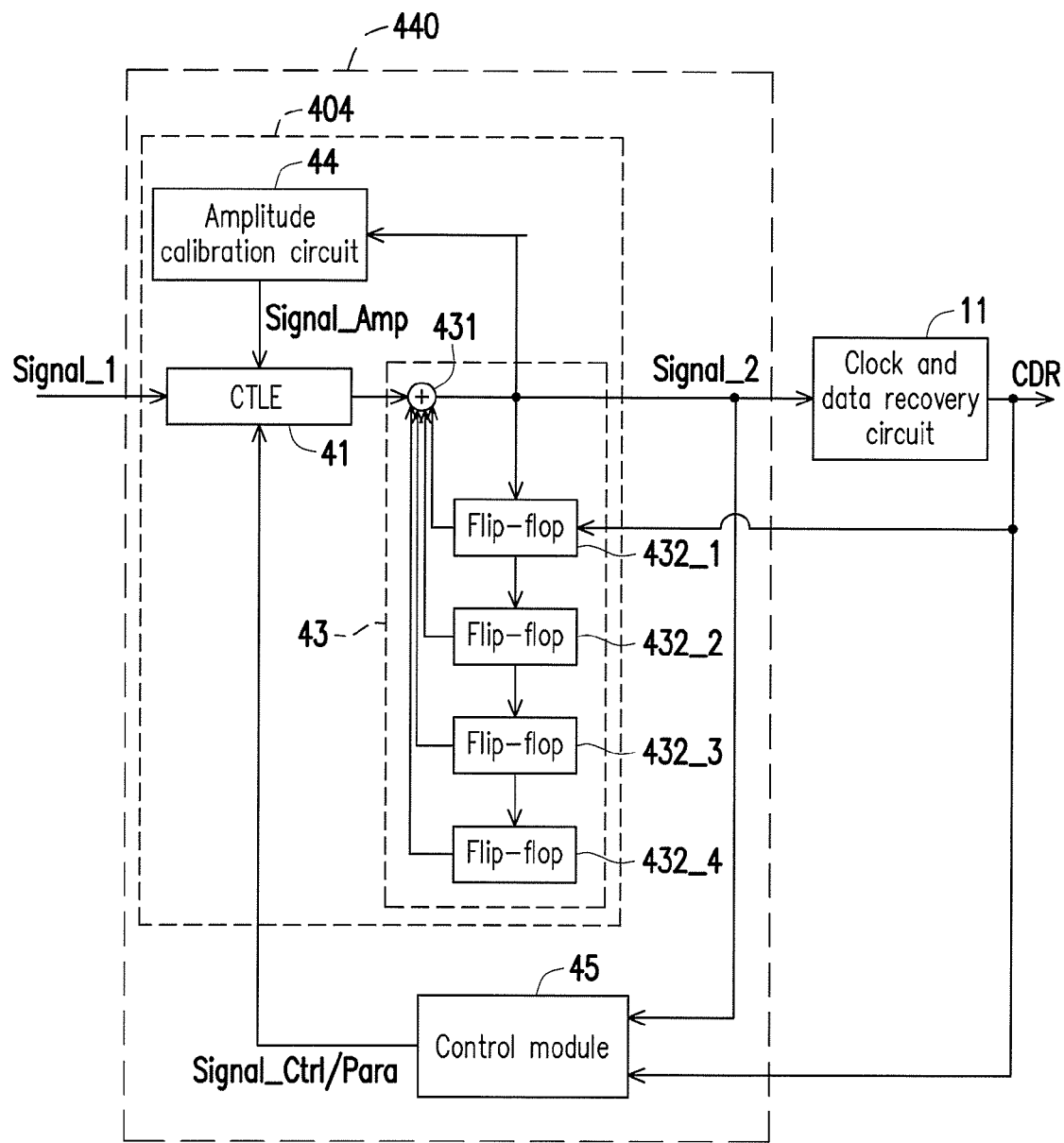
FIG. 4D is a schematic diagram illustrating an adaptive equalizer including a CTLE, a decision feedback equalizer (DFE) and an amplitude calibration circuit according to an exemplary embodiment of the disclosure.

FIG. 4D is a schematic diagram illustrating an adaptive equalizer including a CTLE, a decision feedback equalizer (DFE) and an amplitude calibration circuit according to an exemplary embodiment of the disclosure.

With reference to FIG. 4D, an adaptive equalizer 440 includes the equalizer module 404 and the control module 45. The equalizer module 404 is coupled to the control module 45. The control module 45 is configured to generate the signal Signal_Ctrl and the parameter Para. For example, the control module 45 may include the power mode configuration module 302 and the algorithm circuit 34 illustrated in FIG. 3. Additionally, the adaptive equalizer 440 is also coupled to the clock and data recovery circuit 11.

The equalizer module 404 includes the CTLE 41, the DFE 43 and the amplitude calibration circuit 44. The CTLE 41 receives the Signal_Ctrl to operate in the corresponding power mode and modulates the signal Signal_1 according to the signal Signal_Amp and the parameter Para. The DFE 43 is coupled to the output of the CTLE 41.

The DFE 43 includes an adder circuit 431 and flip-flops 432_1 to 432_4. The adder circuit 431 adds the output of the CTLE 41 with outputs of the flip-flops 432_1 to 432_4 to generate the signal Signal_2. The flip-flop 4321 is coupled to an output of the adder circuit 431 and generates an output according to the signal Signal_2. For example, the flip-flop 4321 samples the signal Signal_2 according to the output clock CDR to generate an output. The flip-flops 432_1 to 432_4 are connected in series. The output of the flip-flop 432_1 becomes an input of the flip-flop 432_2, the output of the flip-flop 432_2 becomes an input of the flip-flop 432_3, and the output of the flip-flop 432_3 becomes an input of the flip-flop 432_4. The output of each of the flip-flops 432_1 to 432_4 is output to the adder circuit 431. In another exemplary embodiment, the number of the flip-flops 432_1 to 432_4 may be more or smaller.

It should be noted that FIG. 1A, FIG. 2, FIG. 3, FIG. 4A to FIG. 4D only illustrate examples of schematic circuit configuration and element coupling relation of the adaptive equalizer, and it does not mean that the schematic circuit configuration and element coupling relation of the adaptive equalizer must be configured as to the illustration of any one of FIG. IA, FIG. 2, FIG. 3, FIG. 4A to FIG. 4D. For example, more circuit elements may be added into the corresponding adaptive equalizer in any one of the exemplary embodiments illustrated in FIG. 1A, FIG. 2, FIG. 3, FIG. 4A to FIG. 4D to achieve better technical effects or produce additional functions. Alternatively, the coupling relation among the circuit elements may also be changed in any one of the exemplary embodiments illustrated in FIG. 1A, FIG. 2, FIG. 3, FIG. 4A to FIG. 4D.

Figure 5:
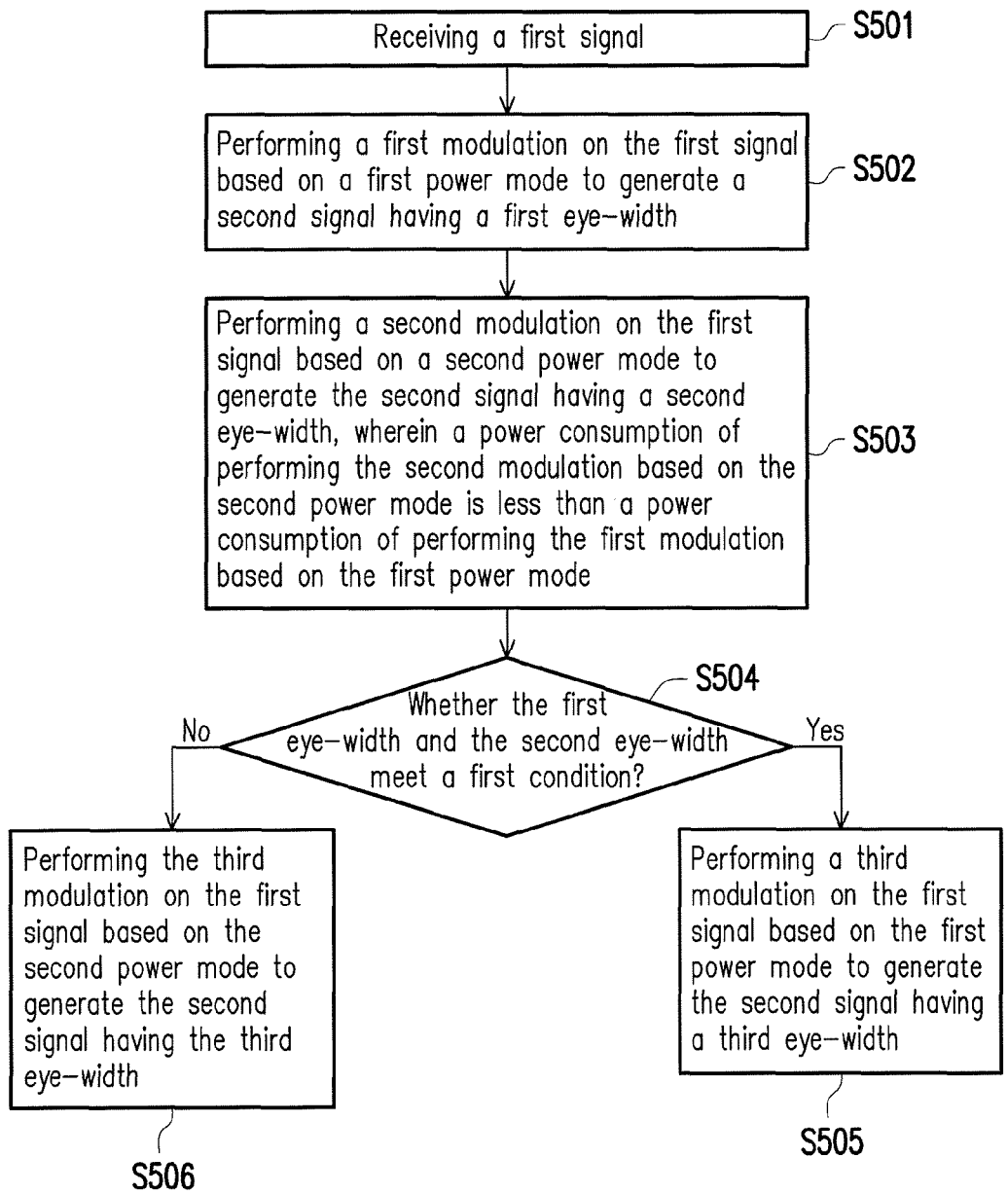
FIG. 5 is a flowchart illustrating a signal modulation method according to an exemplary embodiment of the disclosure.

FIG. 5 is a flowchart illustrating a signal modulation method according to an exemplary embodiment of the disclosure.

With reference to FIG. 5, in step S501, a first signal is received. In step S502, a first modulation is performed on the first signal based on a first power mode to generate a second signal having a first eye-width. In step S503, a second modulation is performed on the first signal based on a second power mode to generate the second signal having a second eye-width. A power consumption of performing the second modulation based on the second power mode is less than a power consumption of performing the first modulation based on the first power mode. In step S504, whether the first eye-width and the second eye-width meet a first condition is determined. If the first eye-width and the second eye-width meet the first condition, in step S505, a third modulation is performed on the first signal based on the first power mode to generate the second signal having a third eye-width. If the first eye-width and the second eye-width do not meet the first condition, in step S506, the third modulation is performed on the first signal based on the second power mode to generate the second signal having the third eye-width.

Figure 6:
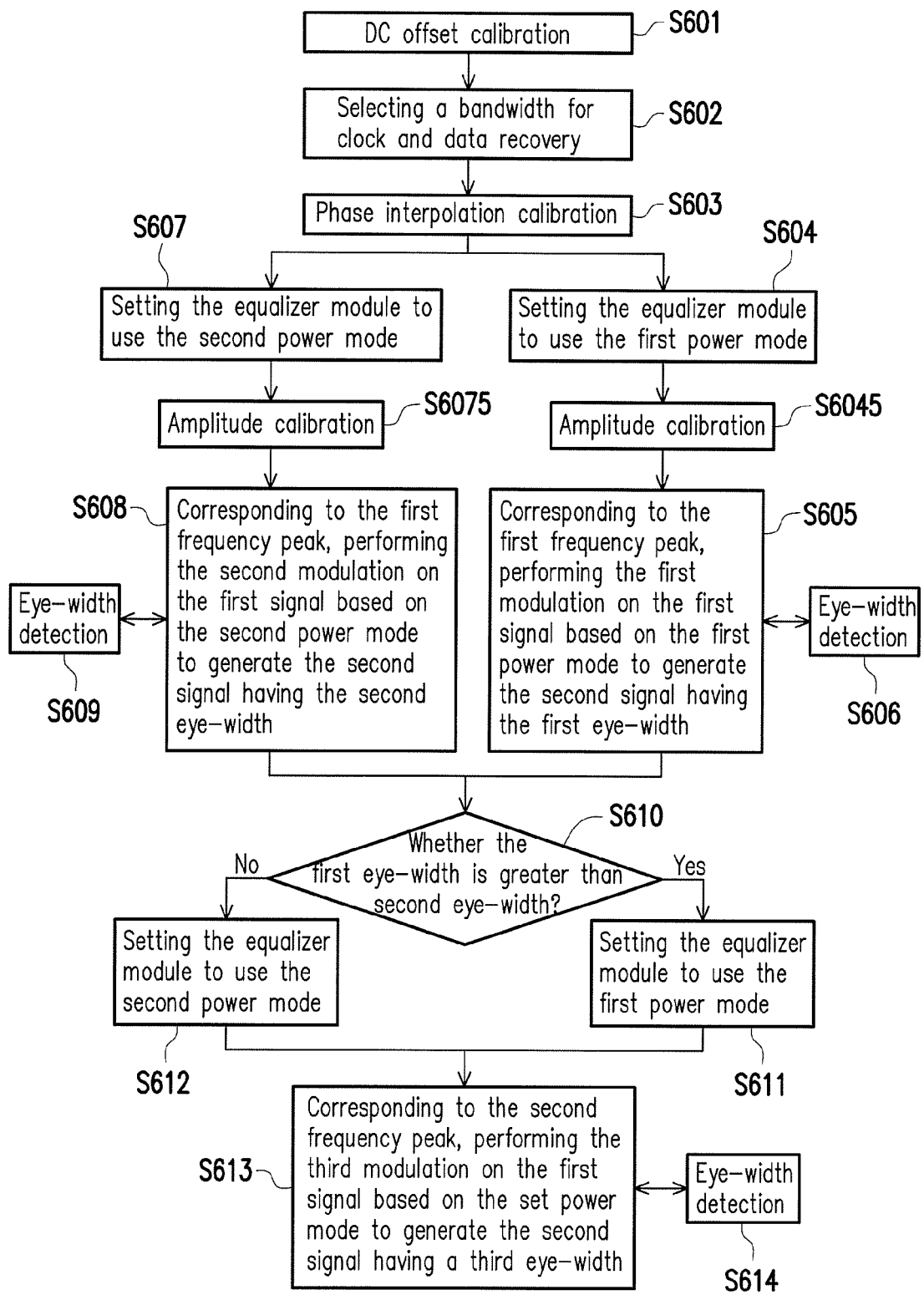
FIG. 6 is a flowchart illustrating a signal modulation method according to another exemplary embodiment of the disclosure.

FIG. 6 is a flowchart illustrating a signal modulation method according to another exemplary embodiment of the disclosure. In the present exemplary embodiment, the equalizer module includes at least one CTLE. However, in other exemplary embodiments, the equalizer module may also include other types of equalizer.

With reference to FIG. 6, in step S601, a DC offset calibration is performed. In step S602, a bandwidth (or a frequency band) for a clock and data recovery is selected by a clock and data recovery circuit. In step S603, a phase interpolation calibration (PI calibration) is performed by the clock and data recovery circuit. In step S604, the equalizer module is set to use the first power mode. In step S6045, an amplitude calibration is performed on the first signal. Steps S604 and S6045 may also be performed with the sequence exchanged or performed synchronously. In step S605, corresponding to the first frequency peak, the first modulation is performed on the first signal based on the first power mode. In step S606, an eye-width detection is performed. Steps S605 and S606 are repeatedly performed through at least one feedback to generate the second signal having the first eye-width.

On the other hand, in step S607, the equalizer module is set to use the second power mode. In step S6075, the amplitude calibration is performed on the first signal. Steps S607 and S6075 may also be performed with the sequence exchanged or performed synchronously. In step S608, corresponding to the first frequency peak, the second modulation is performed on the first signal based on the second power mode. In step S609, the eye-width detection is performed. Steps S608 and S609 are repeatedly performed through at least one feedback to generate the second signal having the second eye-width. The power consumption of performing the second modulation based on the second power mode is less than the power consumption of performing the first modulation based on the first power mode.

In step S610, whether the first eye-width is greater than second eye-width is determined. If the first eye-width is greater than the second eye-width, in step S611, the equalizer module is set to use the first power mode. If the first eye-width is not greater than the second eye-width, in step S612, the equalizer module is set to use the second power mode. Afterwards, in step S613, corresponding to the second frequency peak, the third modulation on the first signal is performed based on the power mode set in step S611 or S612. A frequency of the first frequency peak is higher than a frequency of the second frequency peak. In step S614, the eye-width detection is performed. Steps S613 and S614 are repeatedly performed through at least one feedback to generate the second signal having the third eye-width.

However, each step of FIG. 5 and FIG. 6 has been described as above and thus, will not be repeated. It should be noted that the steps of FIG. 5 and FIG. 6 may be implemented as a plurality of program codes or circuits, which are not limited in the disclosure. Moreover, the methods illustrated in FIG. 5 and FIG. 6 may be implemented with the exemplary embodiments described above or solely implemented, which construe no limitations to the disclosure.

In an exemplary embodiment, the adaptive equalizer is configured and used in a memory storage device (i.e., a memory storage system). Generally, the memory storage device includes a rewritable non-volatile memory module and a controller (i.e., a control circuit). The memory storage device is usually used together with a host system, such that the host system can write data into or read data from the memory storage device.

Figure 7:
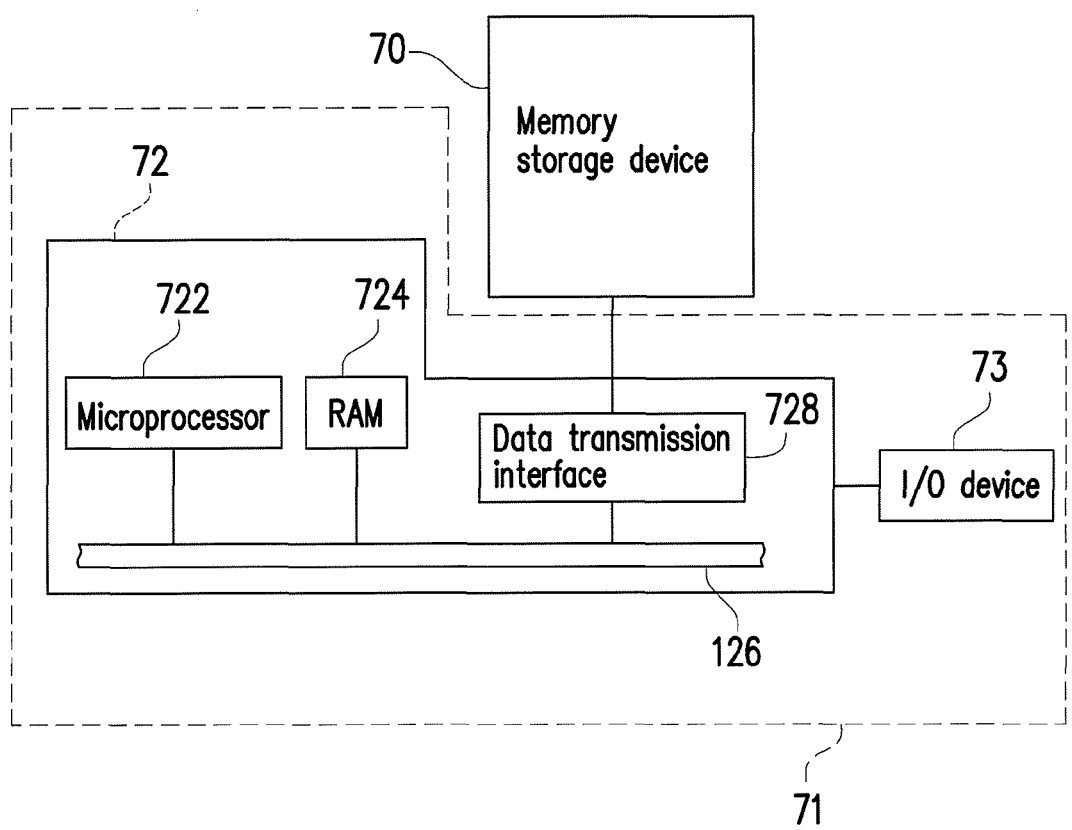
FIG. 7 is a schematic illustrating a host system and a memory storage device according to an exemplary embodiment of the disclosure.
Figure 8:
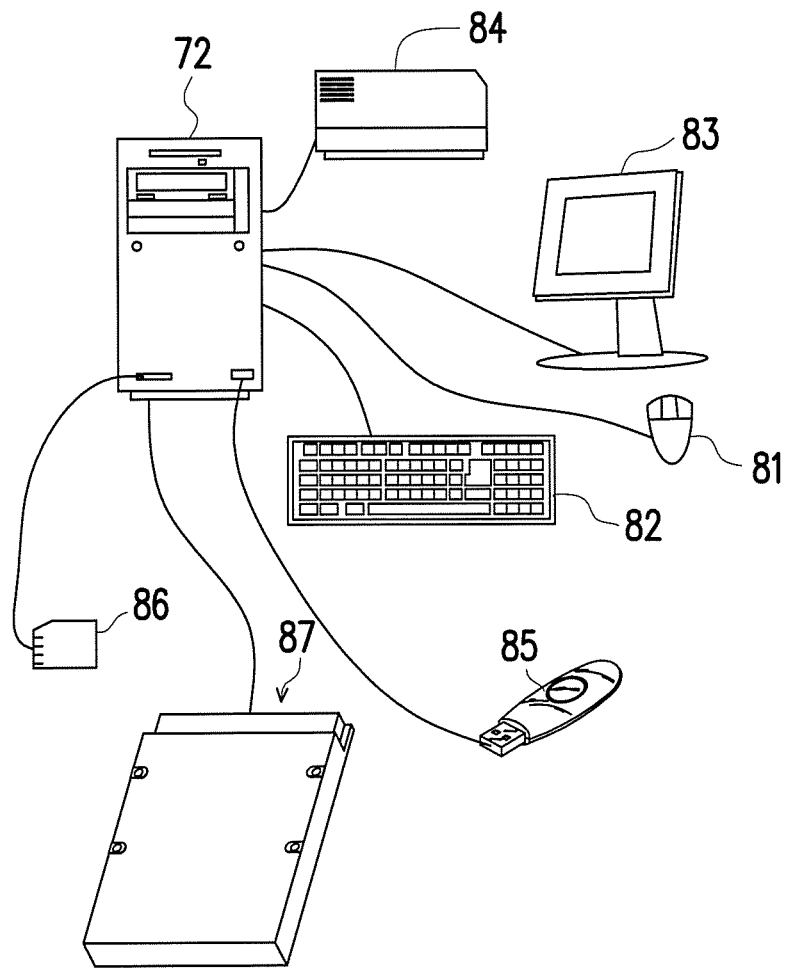
FIG. 8 is a schematic diagram illustrating a computer, an input/output (I/O) device, and a memory storage device according to an exemplary embodiment of the disclosure.
Figure 9:
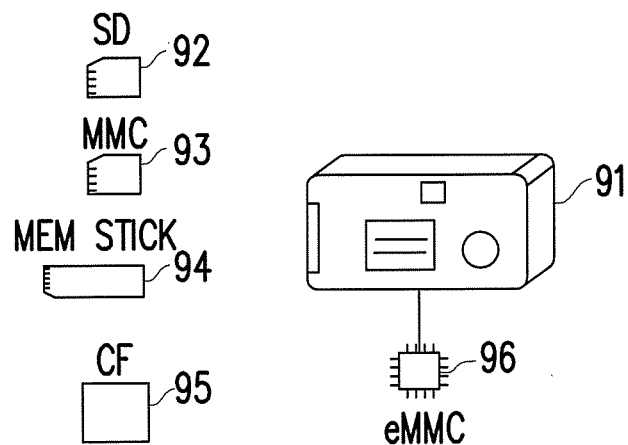
FIG. 9 is a schematic illustrating a host system and a memory storage device according to an exemplary embodiment of the disclosure.

FIG. 7 is a schematic illustrating a host system and a memory storage device according to an exemplary embodiment of the disclosure. FIG. 8 is a schematic diagram illustrating a computer, an input/output (I/O) device, and a memory storage device according to an exemplary embodiment of the disclosure. FIG. 9 is a schematic illustrating a host system and a memory storage device according to an exemplary embodiment of the disclosure.

With reference to FIG. 7, a host system 71 usually includes a computer 72 and an input/output (I/O) device 73. The computer 72 includes a microprocessor 722, a random access memory (RAM) 724, a system bus 726 and a data transmission interface 728. The I/O device 73 includes a mouse 81, a keyboard 82, a display 83, and a printer 84, as shown in FIG. 8. It should be understood that, the devices depicted in FIG. 8 should not be construed as limitations to the I/O device 73, and the I/O device 73 may include other devices as well.

In an exemplary embodiment, the memory storage device 70 is coupled to other devices of the host system 71 through the data transmission interface 728. With the operations of the microprocessor 722, the RAM 724 and the I/O device 73, data can be written into or read from the memory storage device memory storage device 70. For example, the memory storage device 70 may be a rewritable non-volatile memory storage device, such as a flash drive 85, a memory card 86, or a solid state drive (SSD) 87 as shown in FIG. 8.

Generally, the host system 71 can substantially be any system used together with the memory storage device memory storage device 70 for storing data.

Even though the host system 71 is described as a computer system in the present exemplary embodiment, the host system 71 in another exemplary embodiment may be a digital camera, a video camera, a communication device, an audio player, a video player, and so on. For example, if the host system is a digital camera (video camera) 91, the rewritable non-volatile memory storage device is an SD card 92, an MMC 93, a memory stick 94, a CF card 95 or an embedded storage device 96 (as shown in FIG. 9). The embedded storage device 96 includes an embedded MMC (eMMC). It should be noted that that the eMMC is directly coupled to a substrate of the host system.

Figure 10:
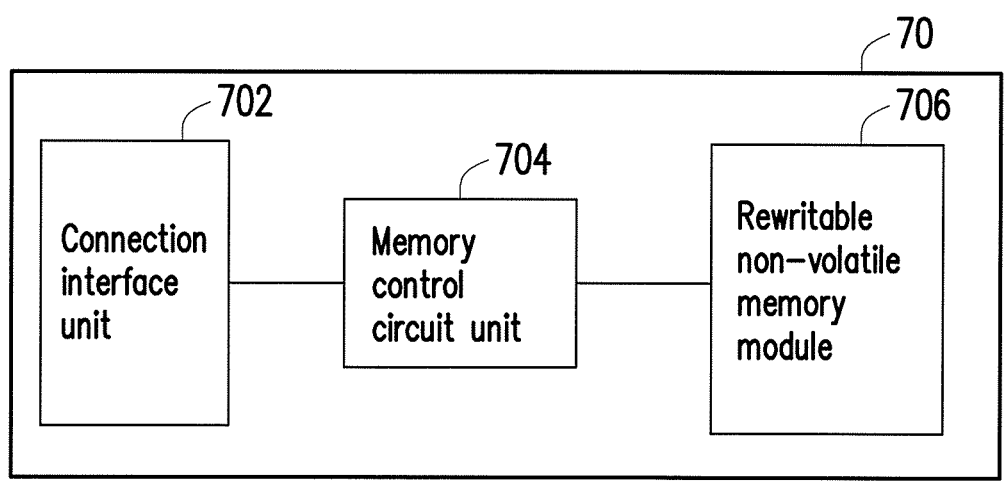
FIG. 10 is a schematic block diagram illustrating the memory storage device depicted in FIG. 7.

FIG. 10 is a schematic block diagram illustrating the memory storage device depicted in FIG. 7.

With reference to FIG. 10, the memory storage device 70 includes a connection interface unit 702, a memory control circuit unit 704 and a rewritable non-volatile memory module 706.

In the present exemplary embodiment, connection interface unit 702 complies with the serial advanced technology attachment (SATA) standard. However, it should be understood that the disclosure is not limited thereto, and the connection interface unit 702 may also comply with the parallel advanced technology attachment (PATA) standard, the Institute of Electrical and Electronic Engineers (IEEE) 1394 standard, the peripheral component interconnect (PCI) express standard, the universal serial bus (USB) standard, the secure digital (SD) standard, the ultra high speed-I (UHS-I) interface standard, the ultra high speed-II (UHS-II) interface standard, the memory stick (MS) interface standard, the multi media card (MMC) interface standard, the eMMC interface standard, the universal flash storage (UFS) interface standard, the compact flash (CF) standard, the integrated device electronics (IDE) standard, or other suitable standards. The connection interface unit 702 may be packaged with the memory control circuit unit 704 in a chip, or the connection interface unit 702 may be disposed outside of a chip including the memory control circuit unit 704.

In an exemplary embodiment, the adaptive equalizer is disposed in the connection interface unit 702 and facilitates in detecting an eye-width and/or an eye-height of a data signal transmitted in the connection interface unit 702, and/or improving a modulation efficiency of the data signal from the host system 71. For example, in an exemplary embodiment illustrated in FIG. 1, the signal Signal_1 may be a signal (e.g., a data signal) from the host system 71, and the adaptive equalizer 10 modulates the signal Signal_1 to generate the signal Signal_2 favorable for analysis and/or sampling. If the modulation efficiency of the data signal from the host system is improved, the capability of the connection interface unit 702 analyzing and/or sampling the signal form the host system 71 may also be improved.

Furthermore, in an exemplary embodiment, the clock and data recovery circuit 11 may also be disposed in the connection interface unit 702.

Memory control circuit unit 704 is configured to is configured to execute a plurality of logic gates or control instructions which are implemented in a hardware form or in a firmware form and perform the operations such as data writing, reading or erasing in the rewritable non-volatile memory module 706 according to the instruction of the host system 71.

The rewritable non-volatile memory module 706 is coupled to the memory control circuit unit 704 and configured to store the data written by the host system 71. The rewritable non-volatile memory module 706 may be a single level cell (SLC) NAND flash memory module (i.e., a memory cell in the rewritable non-volatile memory module 706 can store data of 1 bit), a multi level cell (MLC) NAND flash memory module (i.e., a memory cell in the rewritable non-volatile memory module 706 can store data of 2 bits), a trinary level cell (TLC) NAND flash memory module (i.e., a memory cell in the rewritable non-volatile memory module 706 can store data of 3 bits), other flash memory module or other memory module having the same characteristic.

To summarize, in one of the exemplary embodiments of the disclosure, after a plurality of eye-widths of a signal is detected based on different power modes, a specific power mode in which the adaptive equalizer is to be operated can be determined according to a comparison result of the eye-widths. Thereby, the adaptive equalizer can be dynamically adjusted to the optimized state in a variable environment. The previously described exemplary embodiments of the disclosure have the advantages aforementioned, wherein the advantages aforementioned not required in all versions of the disclosure.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A signal modulation method for an adaptive equalizer, comprising:
   receiving a first signal;
   performing a first modulation on the first signal based on a first power mode to generate a second signal having a first eye-width;
   performing a second modulation on the first signal based on a second power mode to generate the second signal having a second eye-width, wherein a power consumption of performing the second modulation based on the second power mode is less than a power consumption of performing the first modulation based on the first power mode;
   determining whether the first eye-width and the second eye-width meet a first condition;
   if the first eye-width and the second eye-width meets the first condition, performing a third modulation on the first signal based on the first power mode to generate the second signal having a third eye-width; and
   if the first eye-width and the second eye-width does not meet the first condition, performing the third modulation on the first signal based on the second power mode to generate the second signal having the third eye-width.

2. The signal modulation method according to claim 1, wherein the step of determining whether the first eye-width and the second eye-width meet the first condition comprises:
  detecting the first eye-width and the second eye-width;
  comparing the first eye-width and the second eye-width;
  if the first eye-width is greater than the second eye-width, generating a control signal instructing to use the first power mode; and
  if the first eye-width is not greater than the second eye-width, generating the control signal instructing to use the second power mode.

3. The signal modulation method according to claim 2, wherein the first modulation and the second modulation are performed corresponding to a first frequency peak,
  wherein the third modulation is performed corresponding to a second frequency peak,
  wherein a frequency of the first frequency peak is higher than a frequency of the second frequency peak.

4. The signal modulation method according to claim 3, wherein the first eye-width is a maximum eye-width obtained through a feedback in the first modulation,
  wherein the second eye-width is a maximum eye-width obtained through a feedback in the second modulation,
  wherein the third eye-width is a maximum eye-width obtained through a feedback in the third modulation.

5. The signal modulation method according to claim 4, wherein each of the first modulation, the second modulation and the third modulation comprises an operation performed by a continuous-time linear equalizer (CTLE).

6. The signal modulation method according to claim 5, wherein at least one of the first modulation, the second modulation and the third modulation further comprises an operation performed by an infinite impulse response (IIR) circuit.

7. The signal modulation method according to claim 5, wherein at least one of the first modulation, the second modulation and the third modulation further comprises an operation performed by a decision feedback equalizer (DFE).

8. The signal modulation method according to claim 5, wherein at least one of the first modulation, the second modulation and the third modulation further comprises an amplitude calibration.

9. An adaptive equalizer, comprising:
  an equalizer module; and
  a power mode configuration circuit, coupled to the equalizer module,
  wherein the equalizer module is configured to receive a first signal,
  wherein the equalizer module is further configured to perform a first modulation on the first signal based on a first power mode to generate a second signal having a first eye-width,
  wherein the equalizer module is further configured to perform a second modulation on the first signal based on a second power mode to generate the second signal having a second eye-width, wherein a power consumption of performing the second modulation based on the second power mode is less than a power consumption of performing the first modulation based on the first power mode,
  wherein the power mode configuration circuit is configured to determine whether the first eye-width and the second eye-width meet a first condition,
  wherein the equalizer module is further configured to perform a third modulation on the first signal based on the first power mode to generate the second signal having a third eye-width if the first eye-width and the second eye-width meet the first condition,
  wherein the equalizer module is further configured to perform the third modulation on the first signal based on the second power mode to generate the second signal having the third eye-width if the first eye-width and the second eye-width does not meet the first condition.

10. The adaptive equalizer according to claim 9, wherein the power mode configuration circuit comprises:
  an eye-width detection circuit, coupled to the equalizer module and configured to detect the first eye-width and the second eye-width;
  a comparing circuit, coupled to the eye-width detection circuit and configured to compare the first eye-width and the second eye-width; and
  a control circuit, coupled to the comparing circuit and the equalizer module,
  wherein the control circuit is configured to generate a control signal instructing to use the first power mode if the first eye-width is greater than the second eye-width,
  wherein the control circuit is further configured to generate the control signal instructing to use the second power mode if the first eye-width is not greater than the second eye-width.

11. The adaptive equalizer according to claim 10, wherein the first modulation and the second modulation are performed corresponding to a first frequency peak,
  wherein the third modulation is performed corresponding to a second frequency peak,
  wherein a frequency of the first frequency peak is higher than a frequency of the second frequency peak.

12. The adaptive equalizer according to claim 11, wherein the first eye-width is a maximum eye-width obtained through a feedback in the first modulation,
  wherein the second eye-width is a maximum eye-width obtained through a feedback in the second modulation,
  wherein the third eye-width is a maximum eye-width obtained through a feedback in the third modulation.

13. The adaptive equalizer according to claim 12, wherein the equalizer module comprises at least one CTLE,
  wherein each of the first modulation, the second modulation and the third modulation comprises an operation performed by one of the at least one CTLE.

14. The adaptive equalizer according to claim 13, wherein the equalizer module further comprises at least one IIR circuit,
  wherein at least one of the first modulation, the second modulation and the third modulation further comprises an operation performed by one of the at least one IIR circuit.

15. The adaptive equalizer according to claim 13, wherein the equalizer module further comprises at least one DFE,
  wherein at least one of the first modulation, the second modulation and the third modulation further comprises an operation performed by one of the at least one DFE.

16. The adaptive equalizer according to claim 13, wherein the equalizer module further comprises an amplitude calibration circuit,
  wherein at least one of the first modulation, the second modulation and the third modulation further comprises an amplitude calibration performed by the amplitude calibration circuit.

17. A memory storage device, comprising:
  a connection interface circuit configured to couple to a host system;
  a rewritable non-volatile memory module; and a memory control circuit unit, coupled to the connection interface circuit and the rewritable non-volatile memory module, wherein the connection interface circuit comprises an adaptive equalizer, wherein the adaptive equalizer comprises:
- an equalizer module; and
- a power mode configuration circuit, coupled to the equalizer module, wherein the equalizer module is configured to receive a first signal, wherein the equalizer module is further configured to perform a first modulation on the first signal based on a first power mode to generate a second signal having a first eye-width, wherein the equalizer module is further configured to perform a second modulation on the first signal based on a second power mode to generate the second signal having a second eye-width, wherein a power consumption of performing the second modulation based on the second power mode is less than a power consumption of performing the first modulation based on the first power mode, wherein the power mode configuration circuit is further configured to determine whether the first eye-width and the second eye-width meet a first condition, wherein the equalizer module is further configured to perform a third modulation on the first signal based on the first power mode to generate the second signal having a third eye-width if the first eye-width and the second eye-width meet the first condition, wherein the equalizer module is further configured to perform the third modulation on the first signal based on the second power mode to generate the second signal having the third eye-width if the first eye-width and the second eye-width does not meet the first condition.

18. The memory storage device according to claim 17, wherein the power mode configuration circuit comprises:
- an eye-width detection circuit, coupled to the equalizer module and configured to detect the first eye-width and the second eye-width;
- a comparing circuit, coupled to the eye-width detection circuit and configured to compare the first eye-width and the second eye-width; and
- a control circuit, coupled to the comparing circuit and the equalizer module, wherein the control circuit is configured to generate a control signal instructing to use the first power mode if the first eye-width is greater than the second eye-width, wherein the control circuit is further configured to generate the control signal instructing to use the second power mode if the first eye-width is not greater than the second eye-width.

19. The memory storage device according to claim 18, wherein the first modulation and the second modulation are performed corresponding to a first frequency peak, wherein the third modulation is performed corresponding to a second frequency peak, wherein a frequency of the first frequency peak is higher than a frequency of the second frequency peak.

20. The memory storage device according to claim 19, wherein the first eye-width is a maximum eye-width obtained through a feedback in the first modulation, wherein the second eye-width is a maximum eye-width obtained through a feedback in the second modulation, wherein the third eye-width is a maximum eye-width obtained through a feedback in the third modulation.

21. The memory storage device according to claim 20, wherein the equalizer module comprises at least one CTLE, wherein each of the first modulation, the second modulation and the third modulation comprises an operation performed by one of the at least one CTLE.

22. The memory storage device according to claim 21, wherein the equalizer module further comprises at least one IIR circuit, wherein at least one of the first modulation, the second modulation and the third modulation further comprises an operation performed by one of the at least one IIR circuit.

23. The memory storage device according to claim 21, wherein the equalizer module further comprises at least one DFE, wherein at least one of the first modulation, the second modulation and the third modulation further comprises an operation performed by one of the at least one DFE.

24. The memory storage device according to claim 21, wherein the equalizer module further comprises an amplitude calibration circuit, wherein at least one of the first modulation, the second modulation and the third modulation further comprises an amplitude calibration performed by the amplitude calibration circuit.

* * * * *